March 27, 1934.    J. H. WILSON ET AL    1,952,959
GAS METER
Filed Jan. 3, 1933
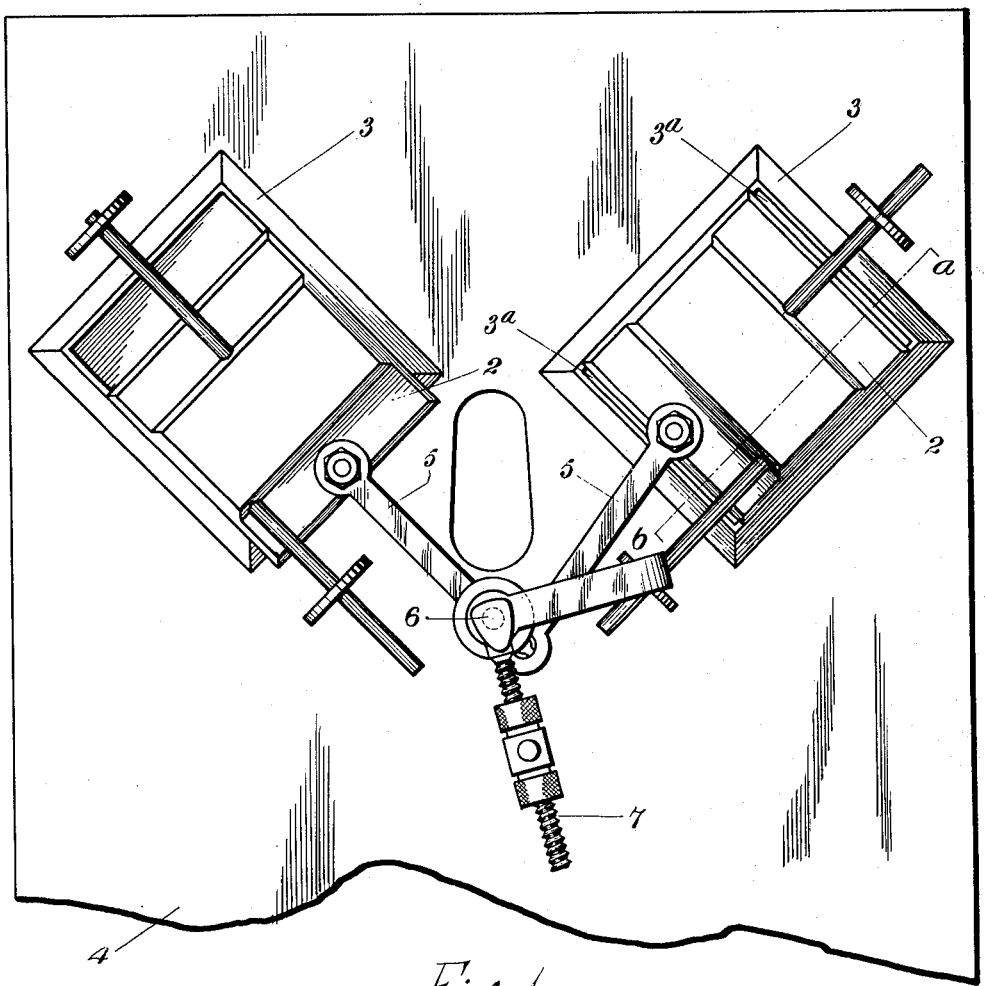
Fig: 1.
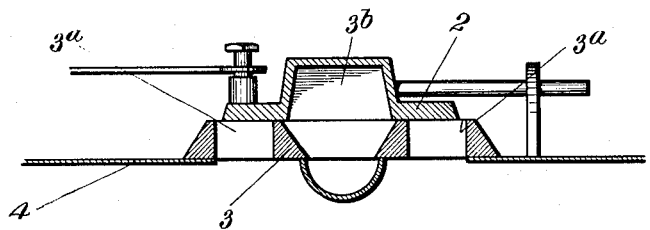
Fig: 2.
INVENTORS:
James H. Wilson
Donald C. E. Poole
by Richard E. Babcock
        Attorney

UNITED STATES PATENT OFFICE 1,952,959

GAS METER

James Henry Wilson and Donald Charles Edward Poole, Baginton, near Coventry, England Application January 3, 1933, Serial No. 649,980
In Great Britain January 5, 1932

3 Claims. (Cl. 73—1)

This invention relates to gas meters of the kind in which the admission and exhaust of the gas is controlled by means of slide valves of the D-section type moving over grids communicating with the measuring chambers and exhaust respectively.

As at present made, these valves are co-extensive with the grid so that, when one valve is in the mid-position, all of the grid ports controlled by that valve are closed and consequently there is, at or about this position of each valve, a dead period during which the continuity of gas flow, to and from the measuring chambers fed through the respective valves, is interrupted. In a meter having a pair of such valves driven by a single crank there are four such interruptions per cycle. These interruptions, as will be understood, cause loss of efficiency and oscillations.

The object of the present invention is to improve the capacity efficiency of the meter by eliminating the dead periods referred to and the consequent recurrent discontinuity of the flow of gas to and from the meter.

According to this invention, a gas meter of the kind herein referred to is characterized in that the valves, as measured in the direction of their movement, are made shorter than their grids so that, when either valve is in the mid-position with the exhaust port closed, both of the admission ports controlled thereby are open to the gas supply with the result that the diaphragm associated therewith is exposed at both sides simultaneously to the supply pressure and consequently offers no resistance to the free movement of the other valve and its associated diaphragm. In this way the dead periods above referred to are entirely eliminated and the capacity efficiency of the meter proportionately increased.

In order to ensure that all the gas entering the meter shall continue to pass through the measuring chambers before leaving the meter, the width of the D-recess in each valve, as measured in the direction of the movement of the valve, is reduced by an amount corresponding with the shortening of the valve so that, although, in the case of each valve, one admission port opens before the other closes, the latter closes to supply before it opens to exhaust.

In order that the invention may be clearly understood and readily carried into practical effect, reference is made in the following description to the accompanying drawing, in which, Figure 1 is a plan view of the valve gear of a gas meter embodying the present invention.

Figure 2 is a cross-sectional view of one of the valves and its grid on the line a—b of Figure 1.

Referring to the drawing, 2, 2 represent a pair of valves of the D-type arranged to reciprocate over grids 3, 3 in a valve plate 4. As shown, the valves are arranged to reciprocate in directions at right angles to each other and are connected by means of links 5, 5 to the single crank of a crank shaft 6 carrying a tangent arm 7 which is operated from the diaphragms in the usual way.

For the purposes of the present invention each of the valves is shortened at each end so that it is no longer co-extensive with the grid as measured in the direction of the valve movement.

The advantage of the shortened valve is that, whenever, as shown, at the right-hand side of Figure 1 and in Figure 2, one of the valves is in the mid-position, both of the admission ports $3^a$, $3^a$ are slightly open so that the diaphragm of the corresponding measuring chambers is exposed at both sides to the supply pressure and consequently is free to move in either direction and offers no resistance to the free movement of the other valve, the combined result being that there is, in fact, no interruption in the flow of gas to and from the meter, nor any sign of oscillation.

The tendency of the diaphragm, at the mid-position of the valve, to reach a state of equilibrium makes the meter extremely sensitive, the diaphragm being free to move in either direction immediately the balance of pressure is upset on the closing of the admission ports.

The D-recess $3^b$ in the valve is also reduced in width by an amount corresponding to the shortening of the valve relatively to the grid so that although, as aforesaid, the one admission port opens before the other closes, the latter closes to supply before it opens to exhaust. In other respects the construction and operation of the valve may be in accordance with present practice.

We claim:—

1. Valve mechanism for fluid meters comprising admission and exhaust ports within said meter, valves associated with said ports and each controlling both admission and exhaust of the fluid, the dimensions of said valves in each case being such as to leave the admission ports partly open when the exhaust port is closed, and means for actuating said valves.

2. Valve mechanism for fluid meters comprising stationary grids each constituting admission and exhaust ports, valves associated with said grids and each controlling the admission and exhaust of the fluid, and means for moving said valves relatively to said grids, the dimensions of each valve with respect to its grid, as measured in the direction of valve motion being such that, when the valve is in a position in which the exhaust port of said grid is thereby closed, the admission ports of the same grid are partly open.

3. Valve mechanism for fluid meters comprising a plurality of stationary grids each forming admission and exhaust ports, a plurality of valves severally adapted to reciprocate over said grids to control the admission and exhaust of the fluid, said valves, as measured in the direction of their movement, being shorter than their grids so that when any one valve is in the mid-position of its movement the exhaust port is closed and the admission ports are partly open, and means common to all the valves and actuated by the pressure of the fluid for imparting a reciprocatory movement to the valves.

JAMES HENRY WILSON.
DONALD CHARLES EDWARD POOLE.